(12) United States Patent
Reeves

(10) Patent No.: US 7,464,589 B2
(45) Date of Patent: Dec. 16, 2008

(54) SUBMARINE SAMPLER

(75) Inventor: Victor M. Reeves, Port Charlotte, FL (US)

(73) Assignee: The Mosaic Company, Plymouth, MN (US)

( * ) Notice: Subject to any disclaimer, the term of this patent is extended or adjusted under 35 U.S.C. 154(b) by 363 days.

(21) Appl. No.: 11/170,994

(22) Filed: Jun. 29, 2005

(65) Prior Publication Data

US 2006/0000278 A1    Jan. 5, 2006

Related U.S. Application Data

(60) Provisional application No. 60/583,610, filed on Jun. 30, 2004.

(51) Int. Cl.
*G01F 23/00*    (2006.01)
(52) U.S. Cl. .................... 73/299; 73/290 R; 73/291
(58) Field of Classification Search .................. 73/299, 73/290 R, 291, 309
See application file for complete search history.

(56) References Cited

U.S. PATENT DOCUMENTS

| 2,625,820 | A | * | 1/1953 | Whitehead, Jr. et al. ....... 73/309 |
| 2,625,850 | A | * | 1/1953 | Whitehead, Jr. et al. ....... 73/309 |
| 3,435,989 | A | * | 4/1969 | Lorenzen ........................ 222/1 |
| 4,099,560 | A | * | 7/1978 | Fischer et al. ............... 166/350 |
| 4,388,827 | A | * | 6/1983 | Palmer et al. ................. 73/302 |
| 4,393,705 | A | | 7/1983 | Eidschun |
| 5,105,662 | A | | 4/1992 | Marsh et al. |
| 5,207,251 | A | | 5/1993 | Cooks |
| 5,661,228 | A | | 8/1997 | Young |
| 5,816,874 | A | * | 10/1998 | Juran et al. .................... 441/1 |
| 5,901,603 | A | | 5/1999 | Fiedler |
| 6,601,449 | B1 | | 8/2003 | Jones et al. |
| 6,826,956 | B1 | | 12/2004 | Mathews |

FOREIGN PATENT DOCUMENTS

JP    2002227171 A  *  8/2002

OTHER PUBLICATIONS

Silomaster Analog Tank Level Measurement System Series SM-5000/Design Level 10—Installation and Operation Manual, Bindicator® Company, 5/95-Rev C., 1994.
Interface Measurement: VEGAFLEX 67 Series, 3 pages.

* cited by examiner

*Primary Examiner*—Hezron E. Williams
*Assistant Examiner*—Samir M. Shah
(74) *Attorney, Agent, or Firm*—Patterson, Thuente, Skaar & Christensen, P.A.

(57) ABSTRACT

A flooded bin measurement system is provided that includes a submarine sampler for ascending and descending within a liquid of a bin and for measuring the depth of fluid at the submarine sampler's location. In one embodiment, the submarine sampler may ascend and descend along a vertical guide based on adjustments to it buoyancy compared with the liquid in the bin, which may be controlled manually and/or automatically. The measurement system may include a bubbler system for measuring hydrostatic pressure at the submarine sampler for determining its depth within the fluid of the bin. The submarine sampler may include a device having a hollow interior, an open bottom and an air supply line connected to the hollow interior. According to a further embodiment of the invention, the submarine sampler may be fixed to a line that is connected to a counterweight at its opposite end.

14 Claims, 5 Drawing Sheets

SUBMARINE SAMPLER

CROSS-REFERENCE TO RELATED APPLICATION

This application claims priority under 35 U.S.C. §119(e) to, and hereby incorporates by reference, U.S. Provisional Application No. 60/583,610, filed 30 Jun. 2004.

FIELD OF THE INVENTION

This invention relates generally to a method for measuring the level of solids in a container. More particularly, the invention relates to a method for measuring the level of solid materials at the bottom of a container holding both liquid and solid materials, and to a measurement system for performing the same.

BACKGROUND OF THE INVENTION

Containers holding both solid and liquid materials are often used in industry. Frequently, the solid materials in these containers are denser than the liquid materials and collect at the bottom of the container. In many instances it is desirable to monitor the level of these solid materials; however, measuring the depth of solids at the bottom of a flooded bin can be difficult, impractical or inaccurate. One obstacle may be that the liquid materials are volatile and/or instable, which may make it unsafe for manual measurements and processes requiring human control. Further, properties of the solid material may prove to be a hindrance to accurate measurements. Yet another obstacle may be the geometry of the bin.

Measurement systems have been developed to attempt to provide accurate and reliable readings of the level of solids in a flooded bin. One method includes dropping a weight connected to a measuring line into the flooded bin to measure the depth at which the weight stops sinking due to contact with solid materials. This method, however, may be unreliable as the accuracy depends on properties of the solid materials and/or liquid. Loose solids may simply "swallow" the weight thereby giving a false reading of the solid level. In addition, dropping a weight typically requires human control or manipulation. If the liquid in the flooded bin is volatile and unsafe, this approach may present hazards to the operator.

Another conventional measurement system includes taking sonography readings on the side of the bin from outside of the bin. However, this type of method may provide inaccurate results for conical bins that empty from the bottom. As such, the level of solids along the sides of the conical bin may be higher than the bin center, which could skew the readings. Another similar measurement method is taking thermographic or infrared readings also from the side of the bin. However, this measurement approach suffers from similar deficiencies as it relies upon the temperature differences of the side of the bin. Unfortunately, the solids level may not rise and fall significantly at the side since the solid empties from the center of the conical bin. Another obstacle to this method is that the temperature may fluctuate significantly due to changes in ambient temperature (i.e., amount of sunlight, and temperature drops from day to night). Therefore, it can be difficult to take accurate and reliable measurements using such an approach. Yet another method of determining solid levels is to use "radar on a rope" technology. However, the dielectric between the solid material and liquid relied upon with this method may not be substantial enough to register an accurate reading, which could prevent reliable measurements.

Accordingly, a need exists for improved apparatus and methods for reliably and accurately measuring the level of solid materials in a flooded bin.

SUMMARY OF THE INVENTION

A flooded bin measurement system is provided that generally includes a submarine sampler for ascending and descending within a liquid of a bin and for measuring the depth of fluid at the submarine sampler's location. According to an embodiment of the invention, the submarine sampler may ascend and descend along a vertical guide based on adjustments to its buoyancy compared with the liquid in the bin. Aspects of the invention provide for manual and automatic control of the submarine sampler. Other aspects provide a bubbler system for measuring hydrostatic pressure at the submarine sampler for determining its depth.

In one embodiment, the submarine sampler includes a device having a hollow interior, an open bottom and an air supply line connected to the hollow interior. Evacuating and providing air to the hollow interior may adjust the buoyancy of the submarine sampler to control its depth within the liquid. According to a further embodiment of the invention, the submarine sampler is fixed to a line that is connected to a counterweight at its opposite end. The counterweight and submarine sampler may be free to be moved laterally for taking measurements at various locations within the bin. Other features and advantages of various aspects of the invention will become apparent with reference to the following detailed description and figures.

DETAILED DESCRIPTION

Figure 1:
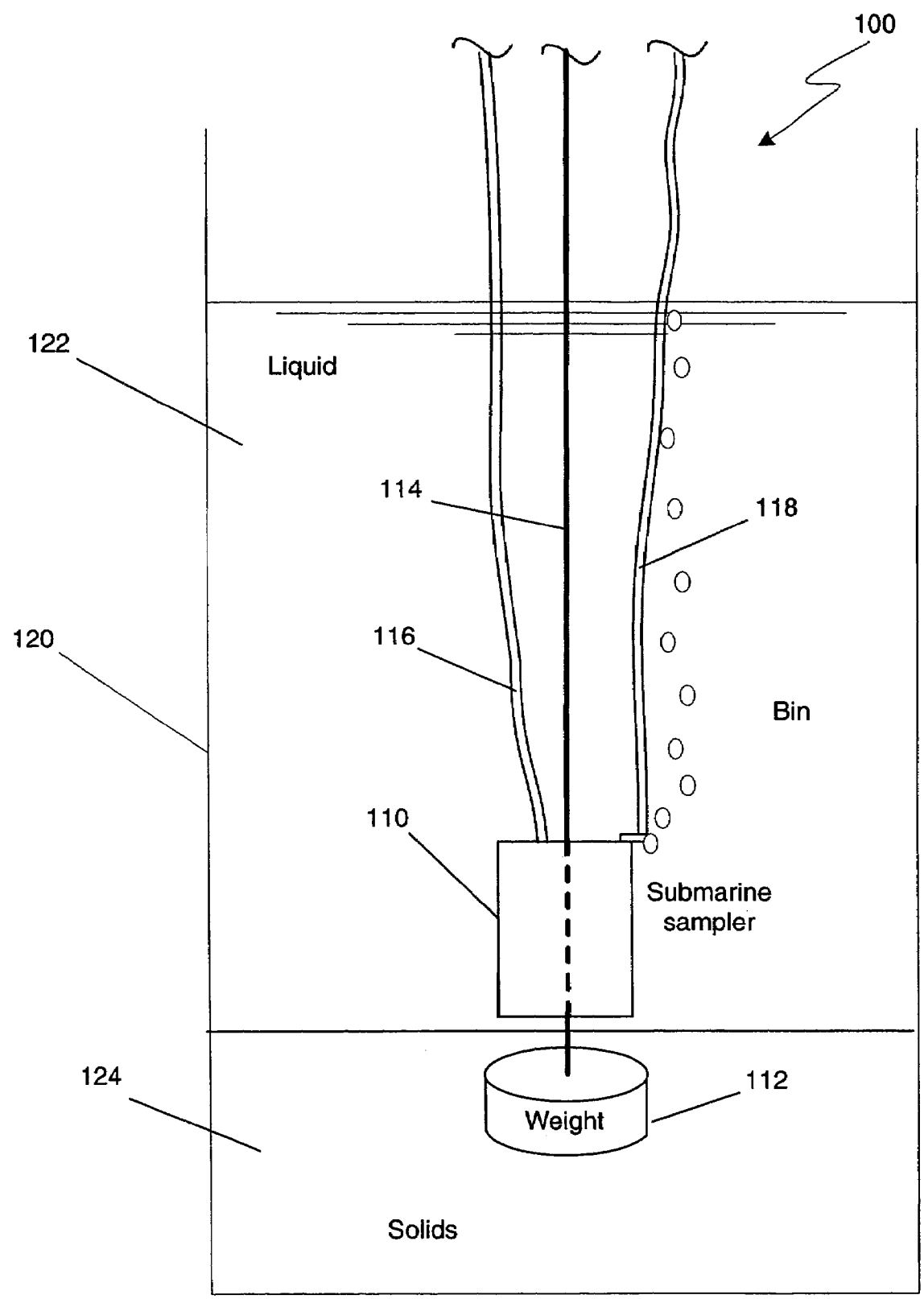
FIG. 1 shows a flooded bin measurement system according to an embodiment of the present invention.
Figure 2A:
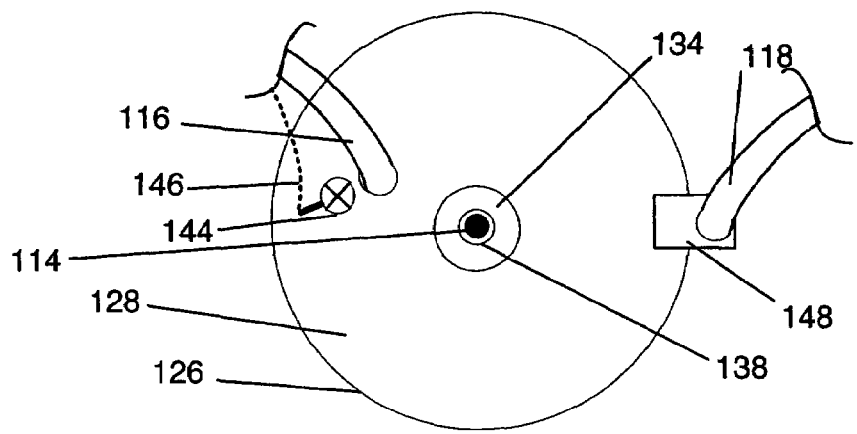
FIG. 2A is a top view of a submarine sampler of the measurement system of FIG. 1.
Figure 2B:
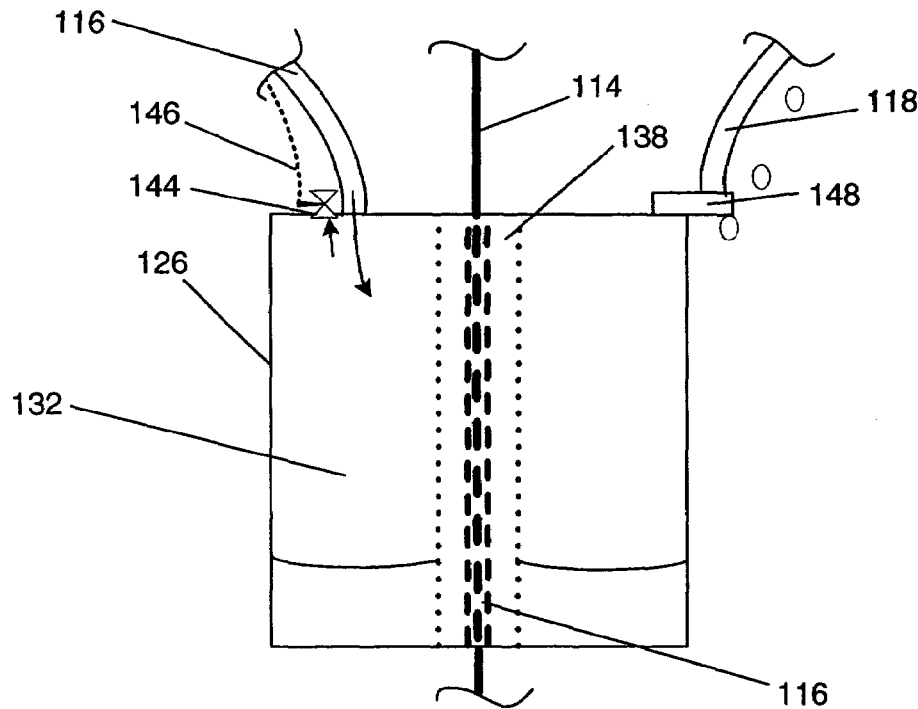
FIG. 2B is a side view of the submarine sampler of FIG. 2A.
Figure 2C:
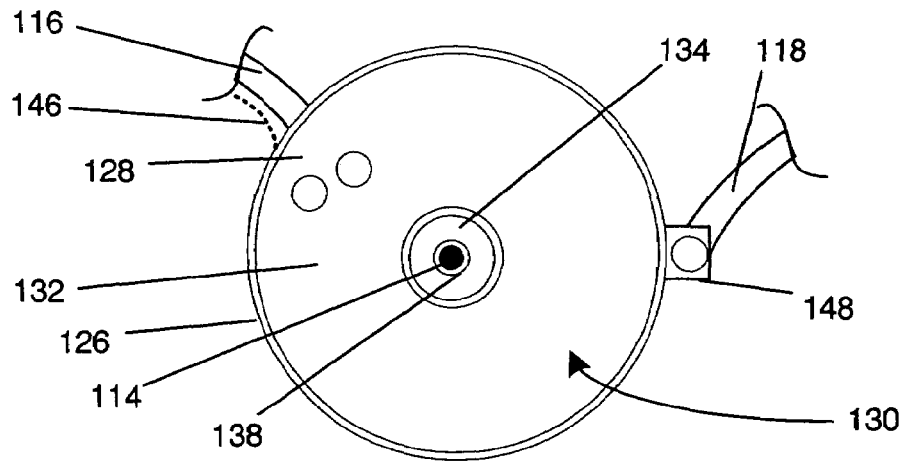
FIG. 2C is a bottom view of the submarine sampler of FIG. 2A.
Figure 3:
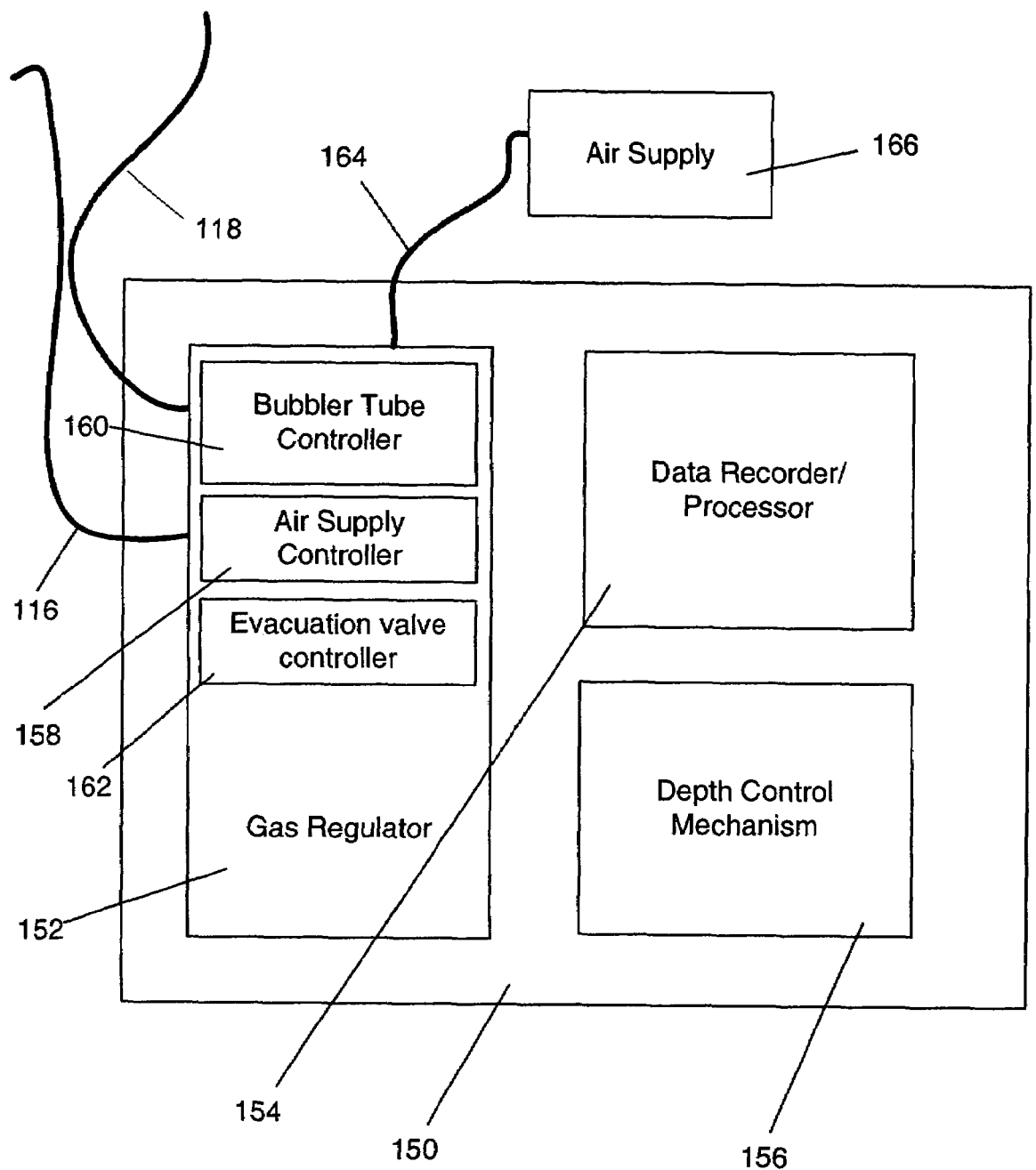
FIG. 3 illustrates a control unit of the measurement system of FIG. 1.

The various aspects of the invention may be embodied in various forms. The following description shows by way of illustration various embodiments in which aspects of the invention may be practiced. It is to be understood that other embodiments may be utilized and structural and functional modifications may be made without departing from the scope of the present invention. Referring now to FIGS. 1-4, a system 100 is generally shown according to an embodiment of the invention for measuring the level of solid materials in a flooded bin via a submarine sampler 110. As shown in FIGS. 1 and 3, system 100 includes a submarine sampler 110, a weight 112, a guide 114, an air supply line 116, a bubbler tube 118, a bin 120 containing a liquid 122 and solids 124, and a control unit 150 (see FIG. 3).

The submarine sampler 110 may be navigated vertically along guide 114 for taking hydrostatic pressure measurements at various depths within bin 120. As such, submarine sampler 110 moves along guide 114, which is preferably kept taut, as it ascends and descends within bin 120. Guide 114 may include a steel cable, rod or other guide member that is secured at a top end to a support (not shown), such as a bin lid, a building fixture or a structure overhanging bin 120, and which may be kept taut by weight 112 at its bottom end. Weight 112 is an object of sufficient mass to hold guide 114 taut and in a specified position based on factors such as anticipated liquid density, type of solids to be encountered and tank conditions (e.g., turbulence). As shown in FIG. 1, weight 112 may be designed to submerge within solid materials 124. Because weight 112 acts as an anchor, it may simply hang at a sufficient depth to permit navigation of submarine sampler 110 within a desired range. Alternatively, it may reach the full depth of bin 120 and may be attached to the bottom of the bin. A hanging configuration for weight 112 and guide 114 that is unattached to the bottom of the bin permits the weight and guide to be removed and installed along with submarine sampler 110 as desired.

Properties of guide 114, such as tensile strength, material composition and corrosion resistance, and of weight 112, such as mass, material composition, geometry and corrosion resistance, may be selected according to system requirements and to ensure that the strength of guide 114 may properly and adequately support the mass of weight 112. For example, weight 112 may include a lead anchor weighing about 50 pounds that is shaped sufficiently compact to permit it to embed itself within solid materials 124. Further, guide 114 may include a stainless steel cable having a tensile strength greater than 50 pounds (plus anticipated forces associated with retrieving the anchor from within the solid materials as needed and/or a safety factor).

Submarine sampler 110 is adapted to ascend and descend along guide 114 by adjusting its buoyancy relative to liquid 122; however, other embodiments (not shown) may use alternative mechanisms to raise and lower the sampler unit. As shown in FIGS. 2A, 2B and 2C, submarine sampler 110 according to this embodiment includes a hollow cylinder 126 having a closed top 128, an open bottom 130, an open space 132 and a center sleeve 134. Center sleeve 134 forms a guide channel 138 through which guide 114 is threaded. Center sleeve 134 may include a wear resistant material, such as high density polyethylene, that slides easily along guide 114 and protects the rest of the cylinder against wear due to rubbing contact with guide 114. Preferably, sleeve 134 is replaceable to permit periodic replacement as it wears. To further reduce wear, guide 114 may also include a wear resistant material such as a polyethylene coating to protect the guide 114. Maintaining such a protective coating may further permit the attachment of air tubes 116 & 118 to the guide 114. By locating the twin air tubes 116 & 118 around the guide 114 (not shown), wear may be reduced on the air tubes 116 & 118 as well.

Hollow cylinder 126 may be made of a rigid material, such as aluminum, stainless steel, plastic, etc., that can withstand long-term submersion in liquid 122 without significant degradation. The mass of hollow cylinder 126 should be sufficient for it to sink to the bottom of bin 120 when open space 132 primarily contains liquid 122. Alternatively, hollow cylinder 126 may be relatively lightweight to permit additional weights (not shown) to be added or removed as needed for adjusting its mass for use with bins of various heights and/or for liquids of various densities.

In order to vary the buoyancy of cylinder 126 and thereby move it vertically through liquid 122 within flooded bin 120, an air supply line 116 is attached to top 128. Line 116 extends from the submarine sampler to an air supply 166 (see FIG. 3), which provides compressed air as needed to open space 132. In other configurations, line 116 may also connect to the atmosphere for evacuating air from within open space 132 through line 116 (e.g., if undesirable to introduce air into liquid 122 when evacuating open space 132) and/or may include a plurality of lines. The addition of air into open space 132 forces liquid 122 out of submarine sampler 110 via its bottom 130, which increases its buoyancy and may cause it to rise along guide 114 through liquid 122.

In order for the submarine to descend within liquid 122, air may be evacuated from open space 132 to permit liquid to enter the open space via bottom 130. As shown in FIGS. 2A-2C, an air release valve 144 may be attached to top 128 for permitting air to leave open space 132 as needed. Air release valve 144 may include a solenoid valve attached to a signal wire 146, which can control operation of the valve to open and close as needed. When air release valve 144 is opened, the buoyancy of the submarine sampler is reduced causing it to sink within the liquid. Air may be added and released from open space 132 as needed via air supply line 116 and air release valve 144 to cycle the height of the submarine sampler within the bin.

In one variation, the air release valve 144 may be located in a remote control unit (not shown) comprising a programmable logic controller. The air release valve may also include a three-way component that allows for both the injection and evacuation of air from open space 132. The injection and evacuation functions of the air release valve may be coordinated and controlled by a programmable logic controller in the remote control unit. When a user wants the submarine sample to rise, the controller may increase the buoyancy force of the submarine sampler by instructing the valve to inject air through tube 116 into open space 132. However, to submerge the sampler, the programmable controller may, instead, energize the valve and vent the tube 116 thereby evacuating air from the open space 132 and decreasing the buoyancy force. To facilitate such a multiple valve system, each tube 116 & 118 may further comprise two compartments, one for the evacuation of air and one for the injection of air.

The depth of submarine sampler 110 within liquid 122 can be measured via bubbler tube 118 attached to the submarine sampler, as shown in FIGS. 2A-2C. Bubbler tube 118 provides a relatively constant flow of air into liquid 122, which helps to prevent the bubbler tube from clogging. Back pressure within bubbler tube 118 can be measured as desired, such as when submarine sampler 110 is submerged. A comparison of the back pressure measured within bubbler tube 118 with a measurement of atmospheric pressure provides the hydrostatic pressure of liquid 122 at the depth of the submarine sampler. Based on the known density of liquid 122, a control unit (discussed later) can determine the depth of the submarine sampler within the liquid.

Bubbler tube 118 may be attached to submarine sampler 110 via a flange 148 or other attachment mechanism. Bubbler tube 118 and/or air supply line 116 may be made from flexible tubing such as rubber tubing, high density polyethylene tubing, poly-vinyl chloride tubing, TEFLON tubing or plastic tubing, etc. It may also be made from more rigid materials, such as copper, steel, PVC or other types of pipe; however, rigid piping may need to be configured with a flexible material at some point to allow it to move along with vertical movement of submarine sampler 110. In the event of a clog in the opening of bubbler tube 118, high pressure air and/or steam may be provided to the bubbler tube to purge it.

Referring now to FIG. 3, a control unit 150 is shown according to an embodiment of the invention for controlling and measuring the depth of submarine sampler 110 within bin 120. As shown, control unit 150 generally includes a gas regulator 152, a data recorder/processor 154 and a depth control mechanism 156. These components work in conjunction to operate the system and to determine the level of solid materials 124 within flooded bin 120. Although logically separated in this embodiment, one or more devices may perform the functions of these components. Operation of these components may be automated, such as in accordance with program logic control instructions that control descent of the submarine sampler and recordation of data on a periodic basis. They may also be manually operable, such as via manually operable valves for raising and lowering the submarine sampler along with a manual readout of the depth or raw hydrostatic back pressure data. A simple, manually operable system may include gas regulator 152 for manual control of submarine sampler buoyancy and readout of back pressure data without providing the Data Recorder/Processor or Depth Control Mechanism.

In an automated configuration, the data recorder/processor 154 collects information such as back pressure readings from bubbler tube 118, the change rate of pressure reading, time stamp information for various readings, etc. It may also perform calculations on the data and record information according to its programming and logic. Further, depth control mechanism 156 may automatically control the depth of submarine sampler 110 via modifications to the buoyancy of the sampler. As such, control mechanism 156 can modify the buoyancy of the submarine sampler by instructing the gas regulator 152 to either inject or extract gas from the hollow space 132 of the submarine sampler.

Gas regulator 152 includes an air supply controller 158, a bubble tube controller 160, an evacuation valve controller 162, and a compressed air supply line 164 connected to an air supply 166. Air supply controller 158 is connected to air supply line 116 for providing air to the submarine sampler 110 to increase its buoyancy. Air supply controller 158 may include one or more metering valves (not shown) and/or a constant-differential relay (not shown) for providing a controlled amount of compressed air from air supply 166 to air supply line 116 according to instructions from depth control mechanism 156. Evacuation valve controller 162 is connected to signal wire 146 for providing control signals to air release valve 144 on the submarine sampler. The control signals may simply include a voltage or no voltage indication for opening and closing a solenoid valve of release valve 144, or they may be more elaborate control signals for partially opening release valve 144 a specified amount depending on the type of control signal.

Figure 4:
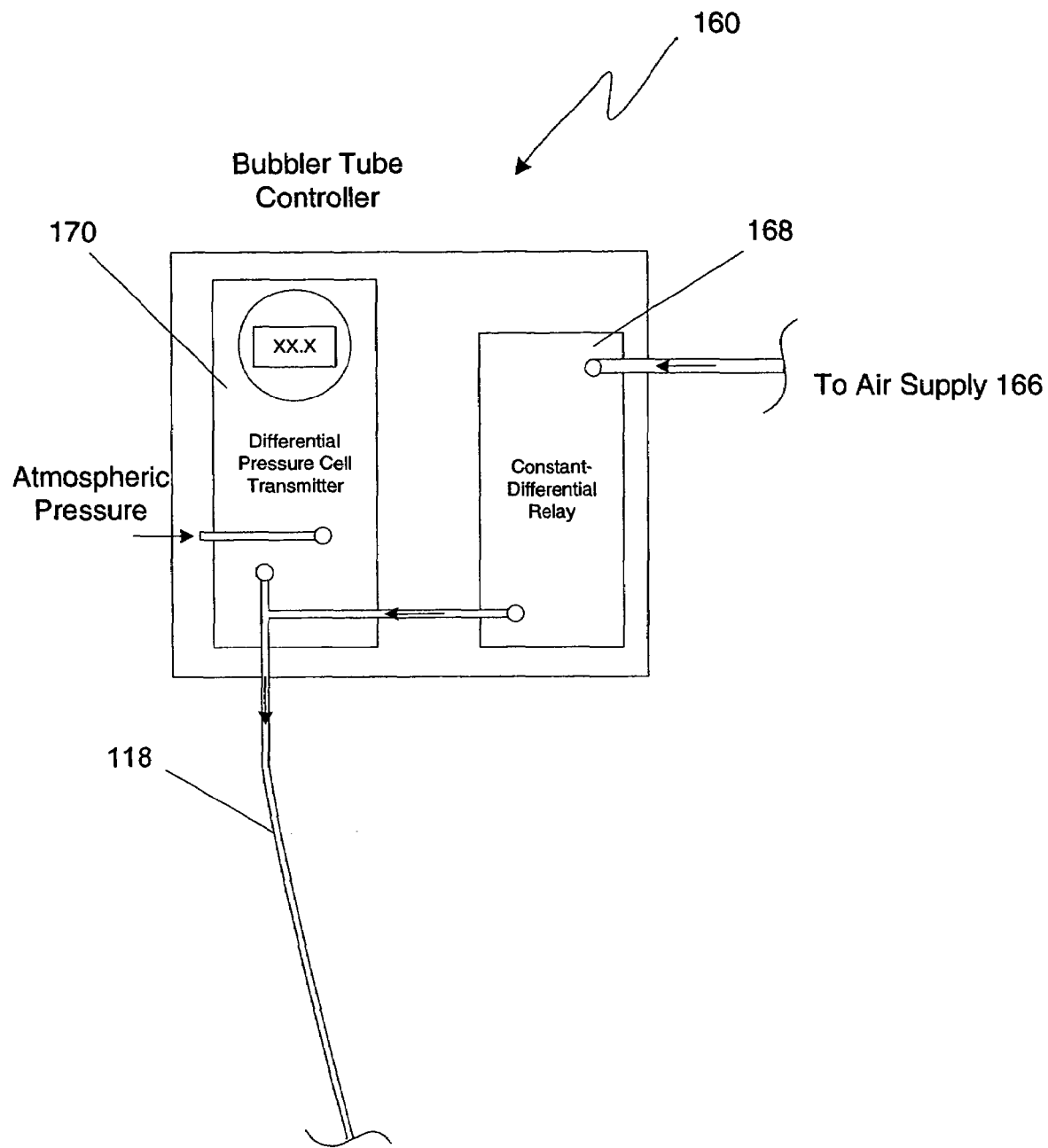
FIG. 4 shows a bubbler tube controller of the control unit of FIG. 3.

Bubbler tube controller 160 is connected to bubbler tube 118 for providing a constant rate of air to bubbler tube 118 from air supply 166 and for sensing the back pressure of air within bubbler tube 118. As shown in FIG. 4, bubbler tube controller 160 may include a constant-differential relay 168 and differential pressure cell transmitter 170, which receives a constant supply of metered air from constant-differential relay 168. Constant-differential relay 168 may be an airflow controller, as is known in the art, such as a MOORE 62VNA Constant-Differential Relay. Constant-differential relay 168 receives compressed air at varying pressure and flow rates and provides air at a constant output pressure and flow rate to bubbler tube 118.

Cell/Transmitter 170 is attached to bubbler tube 118 and senses the overall pressure in the bubbler tube, which changes according to hydrostatic pressure at the submarine sampler 110 based on its depth within liquid 122. As the depth of the submarine sampler changes, the hydrostatic pressure at the submarine sampler changes causing a corresponding change in back pressure of air within bubbler tube 118. Cell/transmitter 170 senses the back pressure in bubbler tube 118 and compares it with atmospheric pressure to determine the pressure differential. This information is transmitted to data recorder/processor 154 (see FIG. 3), which records and processes the data. The pressure differential information may also be read directly from cell/transmitter 170 by an operator. Also, cell/transmitter 170 can be set up to transmit this information to a network, remote recorder, remote controller, etc. (not shown) located apart from the cell/transmitter.

Differential pressure cell transmitter 170 may be an electronic differential pressure cell transmitter, such as a FOXBORO IDP10 Intelligent d/p Cell Transmitter for differential pressure measurement. Cell/transmitter 170 calculates the hydrostatic pressure around the mouth of bubbler tube 118 using a known specific gravity for liquid 122 by comparing the atmospheric pressure and bubbler tube back pressure according to the following formula: $H=\Delta P/Sg$, where $\Delta P$=the difference between the bubbler tube pressure and the atmospheric pressure, and Sg=specific gravity of fluid 122. The vertical level of liquid 122 disposed above the mouth of bubbler tube 118 at the submarine sampler can be determined based on the hydrostatic pressure, H, around the mouth of the bubbler tube.

Constant-differential relay 168 receives pressurized air, which it meters to provide a substantially continuous supply of metered air to bubbler tube 118. The substantially constant flow of air acts to purge any condensation from bubbler tube 118. By providing metered air, fluctuations in the flow of purge air are reduced or eliminated, which reduces sensor inaccuracies related to noise from such fluctuations. Bubbler tube controller 160 is preferably mounted above bubbler tube 118, which reduces the amount of condensation that can collect in the bubbler tube.

Depth control mechanism 156 may automatically control the depth of submarine sampler 110 via modifications to its buoyancy in accordance with programmed instructions. For instance, depth control mechanism 156 may be set up to sample the level of solids in bin 122 on a periodic basis. Control mechanism 156 can modify the buoyancy of the submarine sampler by instructing the gas regulator 152 to either inject or extract gas from the submarine sampler. Additionally, control mechanism 156 may be used to control the amount of time allowed for each measurement, the time interval between each back pressure reading and/or the time interval between each gas injection/extraction.

Control mechanism 156 may further include logic to control the ascent and descent of the submarine sampler 110 to provide more accurate results and to reduce the possibility of the submarine sampler becoming partially buried within the solids material 124. For instance, control mechanism 156 may incrementally adjust the amount of air within open space 132 to slowly raise or lower submarine sampler 110 until back pressure readings stabilize. Once the readings stabilize, the control mechanism may cause the depth of the submarine sampler to be calculated and recorded. Alternatively, control mechanism 156 may wait a given period from the time air release valve 144 is opened to evacuate air in order to permit sufficient time for submarine sampler 110 to completely descend before calculating and recording its depth.

Figure 5:
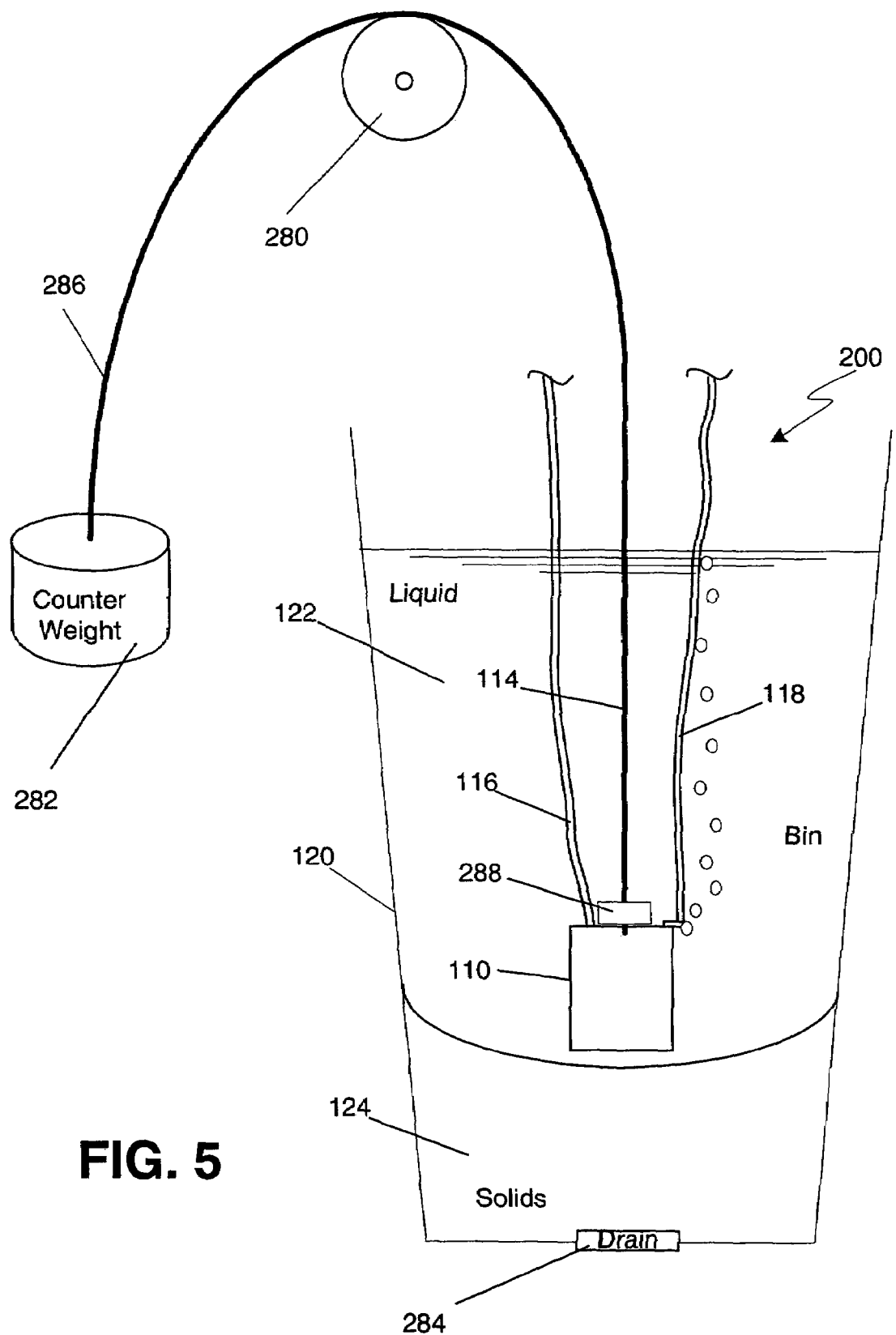
FIG. 5 shows a flooded bin measurement system according to another embodiment of the present invention.

Referring now to FIG. 5, a system 200 is generally shown according to another embodiment of the invention for measuring the level of solid materials in a flooded bin via a submarine sampler 110. System 200 generally includes the aspects and preferences of system 100, except as discussed below. As shown, system 200 generally includes submarine sampler 110, air supply line 116, bubbler tube 118, bin 120 containing liquid 122 and solids 124, and control unit 150, which are common to system 100. As illustrated, bin 120 may be a conical bin having a drain 284 at its bottom or a bin of another configuration, such as the rectangular bin of FIG. 1 or another shape. System 200 also includes a pivot member 280, a counterweight 282, a line 286, and optionally adjustment weights 288.

System 200 provides a flexible system that permits submarine sampler 110 to easily be withdrawn from bin 120 and allows the submarine sampler to measure the depth of solid materials 124 at various locations within bin 120 as desired. System 200 may be used without a weight that can become embedded within the solid materials 124 and become difficult to retrieve, such as weight 112 of FIG. 1. Preferably, counterweight 282 substantially counteracts the mass of submarine sampler 110 such that the submarine sampler has sufficient mass to sink relatively gently to the bottom of bin 120 without embedding itself within solid materials 124 when air is evacuated from within the submarine sampler, and yet provides sufficient force to raise the submarine sampler from the bottom of the bin when it is filled with air. Adjustment weights 288 may be added to submarine sampler 110 to tune the mass differential between the submarine sampler and the counterweight, which may be appropriate for adjusting the system for use with liquids of various densities, bins of various depths, and/or for various process conditions (e.g., turbulence, drainage, rotation, etc. within the bin).

Line 286 may be a steel cable or other flexible member designed for repeated measurements and submersion within liquid 120. For example, a stainless steel cable or a plastic coated carbon steel cable may be appropriate. Pivot member 280 may be a pulley or other pivoting device that can permit a counteracting force to oppose motion of submarine sampler 110 as it ascends and descends within liquid 122. In the embodiment of FIG. 5, pivot member 280 is a pulley that rotates generally horizontally along an axis. Preferably, pulley 280 also rotates generally vertically along an axis, is translatable along a generally horizontal axis, and/or is movable between support locations to permit submarine sampler 110 to be disposed in various locations within bin 120 as desired. Optionally, submarine sampler 110 may be movable along with pivot member 280 to permit it to be used with multiple bins (not shown). Pivot member 280 may be attached to a building fixture, a portion of the bin, a portable support designed for use with system 200, or another support structure. Counterweight 282 is an object of sufficient mass to preferably keep line 286 taut while submarine sampler 110 ascends and descends within bin 120. As with submarine sampler 110, adjustment weight 288 should be designed to be submerged within liquid 122 on a repeated or long-term basis.

Suppose as an example that counterweight 282 weighs about 30 pounds, submarine sampler 110 weighs about 20 pounds and adjustment weights 288 are about 20 pounds. Discounting the mass of line 286, the mass differential is about 10 pounds at the submarine sampler, which encourages it to sink within bin 120 when air is evacuated from it. However, submarine sampler 110 will sink with less downward force (10 pounds force) than if its mass were not counteracted by counterweight 282 (20 pounds of force without counterweight and adjustment weights). Hence, submarine sampler 110 can be adjusted to impact solid materials 124 with less force than without the counterweight, which may reduce the likelihood of the submarine sampler becoming embedded within the solid materials. Suppose that when submarine sampler 110 is filled with air, the air displaces about 20 pounds of liquid 122 from within the submarine sampler. As such, about 10 pounds of force will encourage the submarine sampler to rise to the surface of the liquid when filled with air.

Otherwise, system 200 generally operates in much the same way as system 100. In order to raise submarine sampler 110, air may be pumped into open space 132 through air supply line 116. To encourage submarine sampler 110 to sink, air may be released from open space 132 via air release valve 144. A control mechanism can reduce the amount of human control necessary in the process. For instance, the pumping of air through air supply line 116 may be controlled via control unit 150 described along with FIGS. 3 and 4.

While the present invention has been described in connection with the illustrated embodiments, it will be appreciated and understood that modifications may be made without departing from the true spirit and scope of the invention. In particular, the invention applies to a wide variety of measurement systems and methods. For instance, rather than using a hollow cylinder for the submarine sampler according to the disclosed embodiments, other shapes and designs for submarine samplers may be used. As an example, an adjustable volume bladder may be attached to solid mass to change the overall buoyancy of the combination and to thereby cause the mass to ascend and descend within a flooded bin based on the volume of the bladder. In another example, instead of a bubbler tube measurement system, a linear distance measurement device may be attached to line 286 to measure its movement from a set point as the submarine sampler rises and lowers for determining the depth of the submarine sampler. In another example, rotations of pulley 280 may be measured to determine the depth of the submarine sampler from a set point as it ascends and descends within the bin. Moreover, methods and systems of the present invention may be used to accomplish a variety of other tasks. In one example, the submarine sampler may be used to take samples of a liquid or solid at a given depth in a container. In another example, the sampler may take temperature readings or disperse a chemical at a given level and/or time in a particular process. Additionally, a variety of systems and methods may be used to measure pressure in a bubble tube. Further, methods and systems of the present invention do not need to include all aspects and features disclosed in the embodiments discussed herein.

What is claimed is:

1. A device for measuring a depth of a liquid, comprising:
   a guide;
   a sampler mechanically communicating with the guide;
   an air supply system fluidly communicating with the sampler to vary buoyancy of the sampler;
   a bubbler tube receiving an air flow from the air supply system and emitting the air flow when immersed in the liquid; and
   a regulator measuring back pressure exerted by the liquid in the bubbler tube when the air flow is emitted from the bubbler tube.

2. The device of claim 1, further comprising a weight fixed with respect to the guide.

3. The device of claim 2, in which the weight is coupled to the guide.

4. The device of claim 2, in which the sampler ascends and descends along the guide.

5. The device of claim 2, in which the weight is attached proximate an end of the guide.

6. The device of claim 2, in which the sampler comprises a closed top and an open bottom.

7. The device of claim 6, in which the sampler further comprises a sleeve accommodating the guide.

8. The device of claim 6, in which the air supply system comprises a valve egressing air from the sampler.

9. The device of claim 6, in which the air supply system comprises a valve allowing injection of air into the sampler and evacuation of air from the sampler.

10. The device of claim 2, in which the air supply system comprises an air supply line delivering pressurized air to the sampler.

11. The device of claim 10, in which the regulator comprises a bubbler tube controller controlling the air flow from the air supply system to the bubbler tube, an air supply controller controlling an air flow from the air supply system to the air supply line, and an evacuation valve controller controlling the egression of air from the sampler.

12. The device of claim 11, further comprising a depth control mechanism configured for electrical communication with the air supply controller and the evacuation valve controller.

13. The device of claim 2, further comprising a data recorder recording back pressure readings from the regulator.

14. A bin in combination with the device of claim 2, the bin containing the liquid and a deposit of solids at a bottom thereof.

* * * * *